United States Patent [19]

Segerson et al.

[11] Patent Number: 4,902,903

[45] Date of Patent: Feb. 20, 1990

[54] APPARATUS EMPLOYING REFLECTIVE OPTICAL MEANS

[76] Inventors: Eugene E. Segerson, 108 W. Erie, Tempe, Ariz. 85282; David L. Vowles, 3249 E. Altadena, Phoenix, Ariz. 85028; David D. Hanson, 8234 E. Gail Rd., Scottsdale, Ariz. 85260

[21] Appl. No.: 263,652

[22] Filed: Oct. 27, 1988

[51] Int. Cl.$^4$ ............................................. G01N 21/86
[52] U.S. Cl. .................................... 250/561; 250/229
[58] Field of Search ............... 250/561, 239, 229, 551, 250/552, 211 J, 231 P, 211 K; 280/707, 703, 6.1, 6 R, 124; 267/8 R, 65 D

[56] References Cited

U.S. PATENT DOCUMENTS

| | | | |
|---|---|---|---|
| 3,510,143 | 5/1970 | Carpenter | 280/6 |
| 3,558,155 | 1/1971 | Jackson et al. | 280/124 |
| 3,610,611 | 10/1971 | Elliott | 267/65 D |
| 3,627,348 | 12/1971 | Klees | 280/124 |
| 4,017,099 | 4/1977 | Hegel et al. | 280/707 |
| 4,141,572 | 2/1979 | Sorensen | 280/707 |
| 4,150,299 | 4/1979 | Kasiewicz et al. | 250/561 |
| 4,266,790 | 4/1979 | Uemura et al. | 280/6.1 |
| 4,293,139 | 10/1981 | Brown | 280/6 H |
| 4,309,605 | 1/1982 | Okabe | 250/239 |
| 4,349,735 | 9/1982 | Maeda | 250/229 |
| 4,391,452 | 1/1983 | Ohmori | 280/6.1 |
| 4,555,120 | 11/1985 | Frait et al. | 280/6.1 |
| 4,593,920 | 5/1986 | Natsume et al. | 280/6 R |
| 4,659,104 | 4/1987 | Tanaka et al. | 280/707 |
| 4,718,695 | 1/1988 | Kawagoe | 280/707 |
| 4,741,554 | 4/1988 | Okamoto | 280/703 |
| 4,756,548 | 7/1988 | Kaltenhaler et al. | 280/702 |

Primary Examiner—David C. Nelms
Attorney, Agent, or Firm—Robert M. Handy

[57] ABSTRACT

An improved vehicle height sensor and automotive leveling system are described using, in a preferred embodiment, two optical emitter-receiver pairs mounted in the sidewall or dust cover of a standard automotive air shock. The emitter-receiver pairs are arranged to operate by reflecting light from the central shaft of the shock absorber. Each emitter-receiver pair provides a light path that lies in a plane substantially perpendicular to the extension direction of the shock. The two emitter receiver pairs are spaced apart along the extension direction of the shock. Movement of the internal piston of the shock successively interrupts (by absorption) the light paths of the emitter-receiver pairs so as to provide a positive indication of the location of the movable piston and hence the height of the shock and the height of vehicle body above the road. The emitter-receiver pairs are mounted in a common assembly and seal to the shock dust cover through a single hole. They are convenient to manufacture in a single module which includes the control logic needed to add to remove fluid from the shock to maintain it in reference position independent of the vehicle load. This makes possible a particularly compact unit.

31 Claims, 2 Drawing Sheets

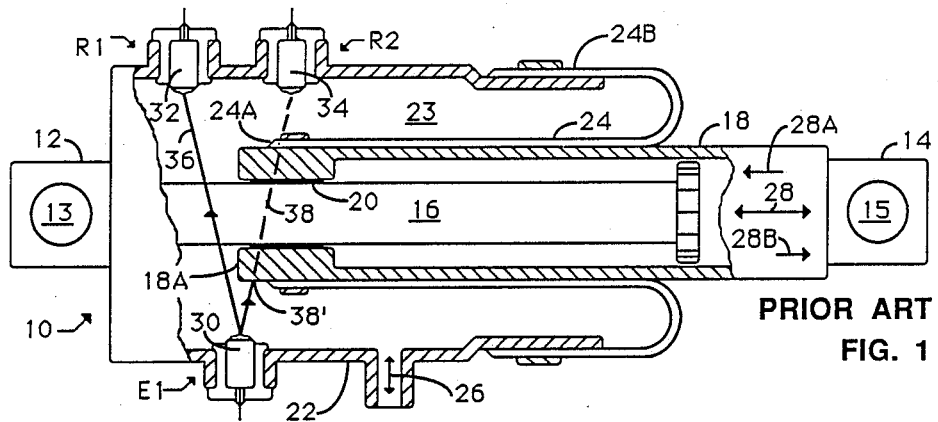
PRIOR ART
FIG. 1
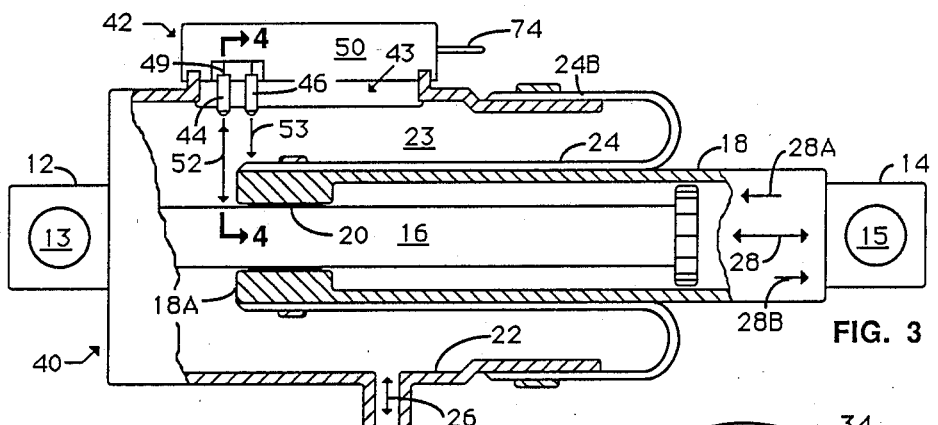
FIG. 3
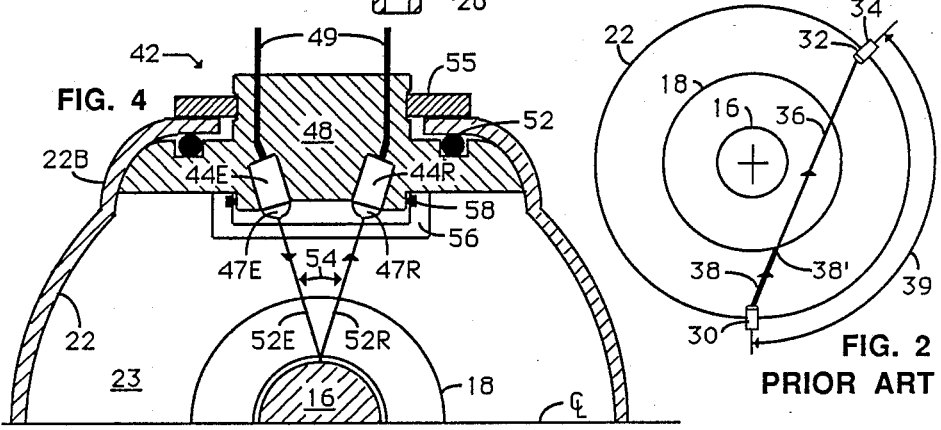
FIG. 4
FIG. 2
PRIOR ART

APPARATUS EMPLOYING REFLECTIVE OPTICAL MEANS

FIELD OF THE INVENTION

This invention relates in general to the field of vehicle height sensors and, more particularly, optical sensing apparatus for use preferably within a vehicle load leveling means for sensing and controlling vehicle height.

BACKGROUND OF THE INVENTION

It is well known in the vehicle art, particularly the automotive art, to provide air cylinders coupled between the frame or body of a vehicle and the axles to adjust the body height above the road in response to varying vehicle loads. In their most common embodiment, such air cylinders are often combined with shock absorbers to provide what are referred in the art as "air shocks". The air shocks combine the damping action of a shock absorber with the load leveling features of an air cylinder. By adjusting the length of the air shock, the body-axle separation and the height of the body above the road may be varied. A typical prior art system is described in U.S. Pat. No. 3,558,155 to Jackson, et al.

The fluid (either liquid or gas) inside the air shock acts as a variable spring. If the vehicle load is increased, the shock is compressed until it balances the added load and the height of the vehicle above the roadway decreases. The vehicle body may be returned to its initial position by forcing more fluid into the shock. Thus, when air shocks are employed, widely different loads may be carried in the vehicle while still maintaining the body at a substantially constant height above the road. This is highly desirable.

There is an increasing desire to provide automatic load leveling equipment on vehicles, particularly automobiles, wherein the height of the vehicle body above the roadway is automatically maintained at a constant distance. In order to do this, it is necessary to have some means for detecting the height of the body above the axles so that the fluid pressure or volume in the air shock may be varied as the vehicle load changes to return the vehicle to its predetermined height.

A number of systems have been used in the prior art to sense vehicle position. For example, a mechanical positioning system is described in U.S. Pat. No. 3,510,143 to Carpenter. Systems using electrical switches are described in U.S. Pat. No. 3,610,611 to Elliot and U.S. Pat. No. 4,293,139 to Brown. A height sensing system utilizing electrical potentiometers is described in U.S. Pat. No. 4,659,104 to Tanaka et al. The use of optical devices for sensing vehicle height is described in U.S. Pat. No. 4,017,099 to Hegel et al., and U.S. Pat. No. 4,391,452 to Ohmori. All of these prior art height sensing arrangements suffer from a number of disadvantages well known in the art. Among these disadvantages are comparatively high cost, difficulty of manufacture, and/or poor reliability. Thus, there is an ongoing need for vehicle height sensors and vehicle height control systems having improved properties.

As used herein the words "air shock" or "shock" are intended to refer to all manner of fluid operable pistons, whether the fluid is liquid or gas, whether the air shock is of the variable length or angular displacement type, and whether or not the air shock incorporates a damping means. As used herein and unless otherwise indicated, the words "light" or "optical" or "optically" are intended to refer in general to the portion of the electromagnetic spectrum having wavelengths in the range of about 0.1 to 100 micrometers.

SUMMARY OF THE INVENTION

Accordingly, it is an object of the present invention to provide an improved vehicle height sensor employing optical devices.

It is a further object of the present invention to provide an improved vehicle height sensor which is compatible with existing air shocks and which does not require changes in vehicle design or attachment points.

It is an additional object of the present invention to provide an improved vehicle height sensor that is adapted to be integrated into an air shock so as to provide a compact sealed unit.

It is a further object of the present invention to provide an improved apparatus for automatically maintaining the height of a vehicle.

In achieving the above and other object and advantages of the invention there is provided, in one form, a sensing apparatus comprising first and second means for attachment to first and second portions of a vehicle whose height is desired to be sensed, wherein the first and second means comprise first and second moveably engaged parts. Extending between the two parts is an enclosure means for providing a pressurizable space around the moveably engaged parts. The enclosure means adapts to changes in the relative position of the moveably engaged parts so as to maintain the pressurizable space. An optical means is provided having a light path extending within the pressurizable space that is at least partly reflected and partly absorbed by relative motion of the moveably engaged parts. The optical means desirably includes at least one optical emitter and two or more sensors for providing an unequivocal indication of the relative position of the moveably engaged parts with respect to a reference position.

In a preferred embodiment suitable for use with a typical, present day, axially extensive air shock having a rubber boot closure or the like, two optical sensors or receivers and at least one (and preferably two) optical emitters are mounted on the external dust cover of the shock. The emitters and receivers are pointed at the longitudinal central shaft of the shock, and spaced along the length direction. Absent reflections, there is substantially no direct optical path between the emitter and receiver of each emitter-receiver pair. The central shaft is connected to one end of the air shock and a movable piston which slides on the central shaft is connected to the other end of the shock.

When the movable piston is extended so as to be located below the reference position, i.e., below both emitter-receiver pairs, then light is reflected to both receivers from the central shaft. When the movable piston is at the reference height, one emitter-receiver pair directs light to and from the central shaft and another substantially identical emitter-receiver pair directs light at the movable piston of the shock that slides axially along the central shaft. The light striking the central shaft is reflected to the first receiver while the light striking the movable piston is substantially absorbed so that little or no light is returned to the second receiver. When the movable piston is located above the reference position, light from both emitters falls on the movable piston and is absorbed so that substantially no light is reflected to either receiver. Thus, the combination of outputs from the two receivers indicates the relative position of the movable piston.

The two emitter-receiver pairs are mounted in a single module which is, desirably, sealed to the sidewall of the air shock. It is desirable but not essential that the sealing means be arranged so that increasing the fluid pressure inside the shock increases the sealing force. A control means responsive to the signals from the optical receivers increases and decreases the fluid pressure (and/or volume) in the shock to maintain the piston height and hence the vehicle height in the reference position. It is further desirable to provide in the module a window transparent to the light emitted by the emitters to separate the emitter-receiver pairs from the pressurizable space.

The above and other objects, features, and advantages of the present invention will be better understood from the following detailed description taken in conjunction with the accompanying drawings.

BRIEF DESCRIPTION OF THE DRAWINGS

FIG. 1 is a partial cross-sectional and cut-away view of an air shock utilizing an optical height sensing arrangement, according to the prior art, and in simplified form.

FIG. 2 is an end view of the interior of the prior art shock of FIG. 1, in schematic form, indicating the light path within the shock.

FIG. 3 is a view similar to that of FIG. 1 but according to the present invention.

FIG. 4 is a partial cross-sectional view of the air shock of FIG. 3, according to the present invention, showing further details of the optical assembly, according to a first embodiment.

DETAILED DESCRIPTION OF THE FIGURES

Figure 5:
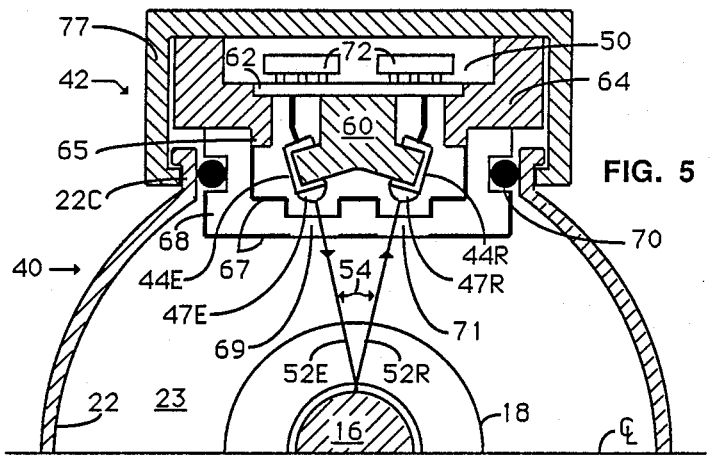
FIG. 5 is a view similar to FIG. 4 but according to a further embodiment of the present invention.

FIG. 1 is a partial cut-away and cross-sectional view of a prior art axially extensible air shock absorber employing an optical height sensor and FIG. 2 is a highly simplified schematic view of the same air shock looking along the longitudinal axis of the shock, showing further details of the optical path within the prior art shock. Referring now to FIGS. 1 and 2, prior art shock 10 has opposed mounting brackets 12, 14 which are used for attaching air shock 10 between the vehicle body (or frame) and the vehicle axle. While mounting means 12, 14 are shown as brackets having holes 13, 15 therein for accepting attachment bolts, any means for attaching the air shock between the body and axle may be used. Central shaft 16 of air shock 10 is rigidly connected to first mounting means 12 and axial cylinder 18 is rigidly connected to second mounting means 14. Cylinder 18 slidably engages shaft 16 at seal 20.

Dust cover 22 is provided extending, in this example, from first mounting means 12 toward second mounting means 14 and coaxially surrounding shaft 16 and cylinder or piston 18. Dust cover 22 could alternatively extend from mounting means 14 toward mounting means 12. Pressurizable space 23 between cover 22, piston 18 and shaft 16 is closed by rolling flexible seal 24. Seal 24 is typically a rubber impregnated fabric boot having end 24A attached to piston 18 and end 24B attached to cover 22. The pressure in space 23 will typically reach about 2 MPa (300 psi) during operation of a conventional air shock.

Air shock 10 has inlet 26 whereby fluid (e.g., a liquid or gas) may be introduced into space 23 thereby forcing piston 18 to slide inwardly or outwardly along shaft 16 in axial direction 28. Prior art shock 10 includes optical emitter 30 and optical receivers 32, 34 mounted in dust cover 22. Shock 10 is generally installed in the vehicle so that mounting means 12 is located higher than mounting means 14 but this is not essential. For convenience of description, the words "above" and "below" used herein, refer to this customary orientation.

Emitter 30 and receivers 32, 34 of prior art shock 10 are azimuthally offset around the perimeter of dust cover 22 by angle 39 of approximately 135 degrees (see FIG. 2). The 135 degree angular displacement is important in the prior art shock, since at larger angles the light path would always be blocked by central shaft 16 and at smaller angles, the light path would never be interrupted by piston 18.

When piston or cylinder 18 is extended outwardly in direction 28B in FIG. 1 so as to be remote from receiver 34, then light rays 36, 38 may travel unimpeded between emitter 30 and receivers 32, 34 without intersecting central shaft 16 or piston 18. As piston 18 moves inward, that is, in direction 28A in FIG. 1, it successively blocks first light path 38 and then light path 36.

When a vehicle employing air shock 10 is lightly loaded, cylinder 18 of shock 10 will move toward its extreme extensive position, that is, in direction 28B. In this situation, light emitted from emitter 30 will reach both receivers 32, 34 along optical paths 36, 38 respectively (see FIGS. 1-2). When the vehicle height is in its reference position, then cylinder 18 will be located on shaft 16 so that end 18A of cylinder 18 lies between optical receiver 32 and optical receiver 34. This is the situation shown in FIG. 1. In these circumstances light ray 36 extending between emitter 30 and receiver 32 is unimpeded, while light ray 38 extending between emitter 30 and receiver 34 is blocked by end portion 18A of cylinder 18 at 38'.

The prior art system illustrated in FIGS. 1-2 above suffers from a number of disadvantages. Among other things, the prior art optical arrangement requires that the emitter and receivers be located at different azimuthal positions about 135 degrees apart around the perimeter of the shock so as to provide a direct line of sight therebetween. Thus, three separate holes are required in the dust cover for these components. This is expensive to make and more prone to leaks. Further, because the emitter and sensors must be spaced widely apart on the dust cover it is very difficult to align and put them into a single module with the necessary control electronics. This further increases the manufacturing cost and reduces reliability. These disadvantages are overcome and other advantages achieved with the arrangement of the present invention illustrated in FIGS. 3 through 9.

FIG. 3, shows a view similar to FIG. 1, but of air shock 40 according to the presentation invention. Air shock 40 has some features in common with prior art shock 10 which are identified by the same reference numerals. Air shock 40 of the present invention has all of the optical components mounted in unitary module 42 which requires only single entrance hole 43 in the side of dust cover 22. Other features of dust cover 22 in FIG. 3 are the same as FIG. 1.

Optical height sensor 42 comprises, in a preferred embodiment, emitter-receiver pairs 44 and 46 which point radially inward from dust cover 22 toward central shaft 16 and which are spaced apart along axial direction 28 of shock 40. Emitter-receiver pairs 44, 46 are connected to integrated control module 50 by connectors 49. Optical paths 52, 53 extend between emitter-receiver pairs 44, 46 and central shaft 16.

FIG. 4 provides a partial cross-sectional view through air shock 40 at the axial location indicated on FIG. 3, showing additional construction details of a first embodiment. Referring now to FIG. 4, emitter 44E and receiver 44R of emitter-receiver pair 44 are mounted in spaced-apart fashion in mounting block 48 and coupled to connectors 49. Emitter 44E and receiver 44R have lenses 47E and 47R, respectively, and are oriented so as to point at shaft 16 running along the central axis of air shock 40. Light ray 52E from emitter 44E is directed toward shaft 16 where it is reflected to form light ray 52R directed toward optical receiver 44R. Rays 52E and 52R are separated by reflection angle 54. Angle 54 should preferably be about 45 degrees or less with 20-25 degrees being convenient and about 22 degrees being preferred. It will be noted that there is no direct optical path between emitter 44E and receiver 44R. This is a particular feature of the present invention.

Mounting block 48 containing emitter-receiver pairs 44, 46 is located in boss or protrusion 22B formed in the side of dust cover 22. In the embodiment shown in FIG. 4 block 48 is sealed to boss 22B by O-ring 52 but any sealing means may be used. Block 48 is conveniently retained in place by externally attached clip 55, but other retention means will also serve. With the arrangement shown in FIG. 4, the fluid pressure contained within space 23 bears upon mounting block 48 so as to force seal 52 tightly against boss 22B in dust cover 22. The higher the pressure in space 23, the greater the sealing force.

Optically transparent window 56 is desirably provided over emitter-receiver pairs 44, 46 to separate the emitter-receiver pairs from pressurized space 23. Optically transparent window 56 may be attached to mounting block 48 by means of gasket 58 or by adhesive or by other sealing means well known in the art, or may be formed as an integral part of block 48. Optically transparent window 56 is desirable to reduce the leak rate from pressurized space 23, for example, around emitter receiver pairs 44, 46 and, as will be explained later, to provide improved focus and cross-talk reduction for the optical components. However, optical window 56 is not essential.

Figures 6, 7:
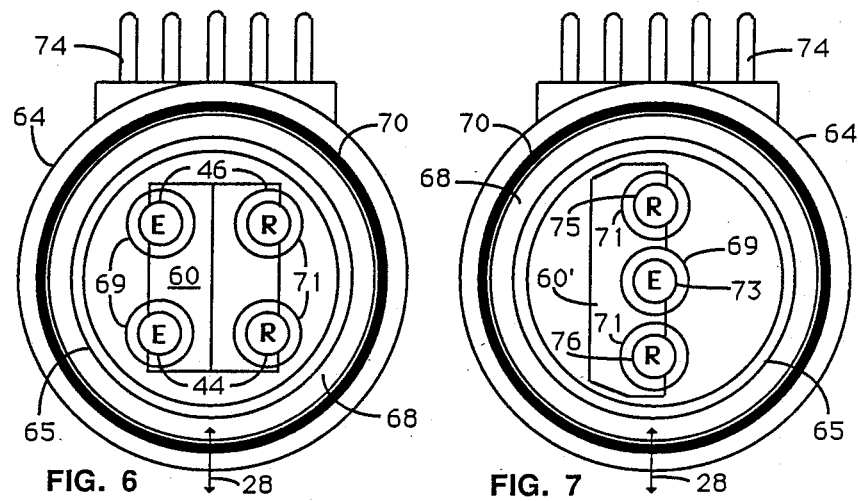
FIG. 6 is a view of the optical assembly portion of the embodiment shown in FIG. 5 as viewed from the central shaft of the shock absorber.
FIG. 7 is a view similar to that of FIG. 6 but according to a further embodiment of the present invention.

FIG. 5 shows a view similar to FIG. 4 but according to a further embodiment of the present invention. FIG. 6 provides a view of the embodiment shown in FIG. 5 looking toward module 42 along optical path 52 from central shaft 16. For simplicity, dust cover 22 and module cover 77 have been omitted in FIG. 6.

Referring now to FIGS. 5-6, emitter-receiver pairs 44, 46 are held at mutual angle 54 in blocK 60 so as to point at central shaft 16. For ease of assembly, the recesses in block 60 intended to retain emitter-receiver 44, 46, have a shape which is slightly more than a half-cylinder in extent. This permits cylindrically shaped emitter-receiver pairs 44, 46 to be snapped into place and retained therein at the desired mounting angle. Mounting block 60 is attached to circuit board 62 by any convenient means. Circuit board 62 is conveniently fabricated separately and mounted in support block 64 but this is not essential. Mounting block 60, circuit board 62 and support 64 may be separate or combined.

Optically transparent window 68 analogous to window 56 extends over emitter-receiver pairs 44, 46 and engages support block 64 at engagement surface 65. Engagement surface 65 insures that optical window 68 is centered with respect to support block 64 and in turn with mounting block 60 which holds emitter-receiver pairs 44, 46. O-ring 70 is conveniently used to seal optical window 68 (and therefore module 42) against dust cover 22 in boss 22C to contain the compressed fluid within pressurizable space 23. Logic circuits 72 (see FIG. 5) for forming control module 50 (see FIG. 3) are provided on circuit board 62 and connected to output pins 74 (see FIG. 6) for coupling module 42 to the rest of the system (see FIG. 9).

The arrangement shown in FIGS. 5-6 provides for particularly convenient assembly of module 42 to shock 40. Module 42 in FIGS. 5-6 need not be installed during construction of shock 40 but may be inserted into boss 22C of dust cover 22 after shock 40 has been entirely assembled. Module 42 of FIGS. 5-6 may be easily installed or replaced at any time during the manufacture of shock 40 and even after shock 40 has been mounted on the vehicle. A further advantage of the embodiment of FIG. 6 is that optical window 68 has a circular shape where it engages dust cover 22 so that a standard circular seal arrangement may be utilized. This reduces the likelihood of leaks. Outer cover 77 is provided as shown in FIG. 5, for example, to cover circuit board 62 and mounting block 64 and to retain O-ring seal 70 at the proper location within boss 22C.

Optical window 68 is desirably provided with lense regions 69, 71 over emitter-receivers 44, 46. Such lense regions permit more precise adjustment of optical paths 52, 53 and makes it simple to accommodate different internal dimensions of shock 40 without having to alter lenses 47E, 47R. Thus, standard fixed focus components can be used for emitter-receiver pairs 44, 46 and module 42 adapted to operate efficiently with different shocks by providing different optical windows 68 having different lense windows 69, 71. Lense windows 69, 71 may be flat, convergent or divergent according to the focus needs of the particular air shock-optical module combination. Such windows are conveniently obtained by molding during fabrication of window 68. Polycarbonate plastic is an example of a suitable material for optical window 68 (depending upon the wavelength of light used) but other materials well known in the art that are optically transparent at the emitter wavelength may also be used. Optical window 68 is conveniently formed by molding.

By providing optically opaque regions, as indicated for example by heavy lines 67 on window 68, the stray (out-of-path) light from emitters 44E, 46E is reduced and the sensitivity of receivers 44R, 46R to stray scattered light within the shock is also reduced. This decreases the possibility of unwanted cross-talk in the unit. For convenience of viewing the internal arrangement of mounting blocks 60, 60' and emitter-receivers 44, 46 and 73, 75, 76, opaque regions 67 have been omitted from FIGS. 6 and 7, and windows 68 therein shown as being fully transparent.

Figures 8, 9:
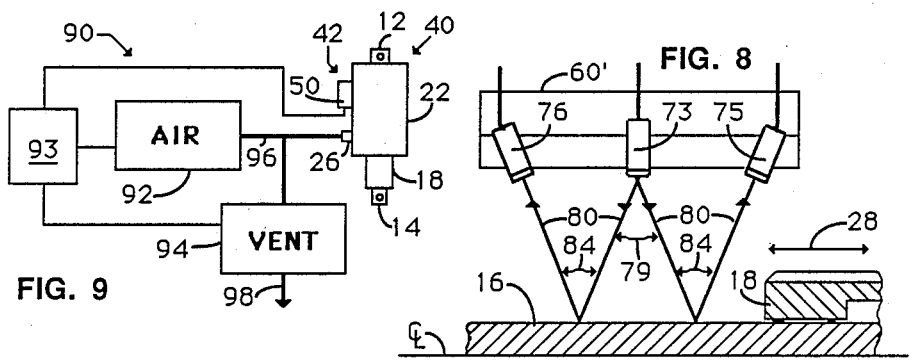
FIG. 8 is a view in schematic form corresponding to the embodiment of FIG. 7, parallel to the longitudinal axis of the air shock and at right angles to FIG. 7, and showing the optical path.
FIG. 9 is a block diagram of an automatic system for adjusting a vehicle levelling air shock, according to the present invention.

FIG. 7 is an illustration similar to FIG. 6 but showing a further embodiment of the present invention. FIG. 8 shows a highly simplified schematic diagram of the interior of shock 40 corresponding to the arrangement of FIG. 7, viewed in a plane parallel to shaft 16 and at a right angle to FIG. 7, and illustrating the optical paths within the shock. Referring now to FIGS. 7-8, single emitter 73 is used in conjunction with two receivers 75, 76 which are spaced apart in direction 28 of air shock 40. With this arrangement, emitter 73 must have sufficiently wide light dispersion angle 79 so that some portion of the light from emitter 73 reflected from shaft 16 at angles 84 along paths 80, reaches receivers 75, 76. The dispersion angle of an otherwise narrow beam emitter may be increased by including a divergent lense 69 over emitter 73 in window 68. Angles 79 and 84 are desirably less than 45 degrees and preferably in the range of about 15-25 degrees, with about 20-22 degrees being convenient. The details of cover 22 and mounting block 64 are omitted in FIG. 8 for clarity. While the arrangement of FIG. 8 allows the use of only one emitter, it is more prone to optical cross-talk than the arrangement of FIG. 6. Cross-talk may be reduced by use of opaque regions 67 covering the out-of-path portions of window 68, as has been previously described.

FIG. 9 illustrates how height sensor module 42 is integrated in system 90 with air source 92 and vent valve 94 to provide actuation of air shock 40. Sensor module 42 comprises emitter-receiver pairs 44, 46 (or 73, 75, 76) and desirably includes logic block 50. Logic block 50 contains the electronic circuitry necessary to decode the responses from emitter-receiver pairs 44, 46 and actuate air source 92 and vent valve 94.

When piston 18 is below the reference position, sensor module 42 with logic block 50 provides the signals to open air source 92 and direct air or other fluid via line 96 to inlet 26 of to shock 40. When piston 18 is in the reference position, then air source 92 and vent valve 94 are off. When piston 18 is above the reference position then sensor module 42 and control logic 50 provide the signal to open vent valve 94 to remove fluid from shock 40 via exhaust line 98. Air source 92 may be conveniently provided by an air pump coupled to an air reservoir, wherein the pump automatically maintains the resevoir at a pressure exceeding the highest pressure required by the air shock. A valve is conveniently included within air souce 92 which, when activated by control logic 50, delivers air to shock 40 via line 96. Pumps, reservoirs and values for these purposes are well known in the art.

If additional power is required to drive the air source output valve and the vent valve, power booster module 93 may be included as shown in FIG. 9. Power booster 93 may be any suitable type of electronic relay or amplifier. Those of skill in the art will understand based on the description herein how to provide the logic needed to interpret the signals from emitter-receiver pairs 44, 46 or 73, 75, 76 to turn on and off air source 92 and vent valve 94 depending on the position of piston 18 as explained above, and to provide power booster module 93 if such is required. Means for decoding the outputs of optical receivers and for boosting logic signals to actuate valves and the like are well known in the art.

Emitters 44E, 46E, are preferably light emitting diodes but other emitters may also be used. Receivers 44R, 46R are preferably phototransistors or photodiodes but other types of optically sensitive electronic components well known in the art may also be used.

In a typical automotive type shock absorber the distance between the central shaft and the emitter-receiver pairs is about 25 mm and the emitter-receiver pairs are spaced apart along direction 28 by about 5-25 mm, more usefully about 10-15 mm, and typically 15 mm. The emitters and receivers have a diameter of about 5 mm and a length of about 5-10 mm or more. Emitter having optical wavelengths in the range of about 600-1000 nanometers are useful with emitters operating at about 930 nanometers being convenient. Such emitters are commercially available, as for example, type MLED 930 light emitting diodes manufactured by Motorola, Inc. Phototransistors are useful for receivers and suitable units are commercially available, such as for example, type MRD 300 phototransistors manufactured by Motorola, Inc. The receivers must be chosen so that they are sensitive to the wavelength light provided by the emitters, and vice-versa. Further, the optical window material must be transparent to the wavelengths provided by the emitters.

Those of skill in the art will understand, based on the description herein, that the spacing and angular separation of the components may be varied depending upon the diameter of shaft 16, piston 18 and dust cover 22, the size of the optical components being used, and the desired width of the reference piston position zone. In general, the greater the axial spacing of the emitter-receiver pairs, the wider the reference piston position zone. With respect to the angular spacing of each emitter-receiver combination, the larger the diameter of cover 22, the smaller the angles 54 (see FIGS. 4-5) and 79, 84 (see FIG. 8) for a given emitter-receiver spacing.

An additional feature of the arrangement described in the present invention is that by making opening 43 in dust cover 22 elongated, one may change the reference height of the shock merely by changing height sensing module 42 without having to change the mechanical design of the shock itself. Since the reference height of the shock is determined by the axial location of emitter-receiver pairs 44, 46 (or 73 75, 76), the reference height of the shock can be altered by replacing one module 42 having a particular emitter-receiver location along direction 28 with another module 42 having a different emitter-receiver location along direction 28. This permits a single shock body to be used for different car models having different reference position requirements, which is a great manufacturing convenience.

A further advantage of the present arrangement is that control electronics 50 may be readily integrated into module 42 immediately adjacent emitter-receiver pairs 44, 46 or 73, 75, 76 since they are located in close proximity. Further, since only a single opening is used in dust cover 22 it is relatively easy to seal and cheaper. Additionally, the receivers may be integrated with some or all of the control logic of module 50 in a monolithic optically sensitive integrated circuit combining receivers and logic to further reduce the size of module 42.

The emitters and receivers utilized in the above described module employ lenses, e.g., 47E, 47R, which are an integral part of the emitter and receiver components. The focal length of the lenses and optically transparent window 56, 68 are desirably chosen so that the combined focal length is related to the distance between the emitters and/or receivers and central shaft 16 so that the best combination of received signal strength with minimum cross-talk is obtained. The optical cross talk is reduced by arranging the lenses to that both emitters and receivers have only a limited field of view. While it is desirable to use an optically transparent window over the emitter-receiver pairs, it is not essential. For example, in FIG. 5, the portion of window 68 incorporating seal 70 may be included in mounting block 64 and the portion of window 68 over emitters-receivers 44, 46 omitted.

It will also be noted that unlike the prior art devices, the invented arrangement described above operates by virtue of the moving piston 18 absorbing the light being emitted from one and/or both emitters so that it is not reflected back to the corresponding receivers. Accordingly, it is important that the outer surface of piston 18 that faces emitter-receivers pairs 44, 46 or 73, 75, 76 be blackened or otherwise rendered optically absorbant. It has been found that this is conveniently provided by having rubber boot 24 extend substantially to inboard end 18A of piston 18.

Having thus described the invention it will be apparent to those of skill in the art based upon the description herein that the invention provides an improved vehicle height sensor that is readily integrated into air shocks in a particularly simple and convenient manner to give a sealed unit. Additionally, the control electronics necessary to actuate the pumps and valves required to fill and empty the air shock may be readily integrated with the emitter-receiver pairs in close proximity thereto and as part of the same module so as to provide a compact module which is simple and inexpensive to install on the shock. Those of skill in the art will appreciate that many variations may be made based on the description herein that remain within the spirit and scope of the invention and it is intended to include such variation is the claims which follow.

We claim:

1. An apparatus having a position sensor, comprising:
    a first portion fixed to a first end of the apparatus;
    a second portion moveably engaging the first portion and fixed to a second end of the apparatus, wherein the position of the second portion relative to the first portion varies in response to varying loads on the apparatus;
    means for enclosing at least part of the first and second portions; and
    reflective optical means for providing at least partly within the enclosing means a light path at least partially interruptible by relative motion of the first and second portions.

2. The apparatus of claim 1 further comprising actuator means responsive to the optical means for returning the second portion to a predetermined location relative to the first portion as load on the apparatus is varied.

3. The apparatus of claim 1 wherein the enclosing means includes a window transparent to the light provided by the optical means and the optical means includes at least one emitter and at least two receivers located outside the enclosing means and facing the window.

4. The apparatus of claim 1 wherein the optical means comprises a transmitter-receiver pair having a light path therebetween located at least partially within the enclosure means and at least partially interruptible by relative motion of the first and second portions.

5. The apparatus of claim 1 wherein the optical means comprises first and second light paths arranged so that relative motion of the first and second portions successively at least partially absorbs the light traversing first one and then another or both of the two light paths.

6. The apparatus of claim 5 wherein the optical means comprises at least one emitter and at least two receivers forming, respectively, between first and second light paths between the at least one emitter and the two receivers having at least one reflection therein.

7. an apparatus comprising:
    a coaxial assembly having first and second spaced apart ends, wherein the coaxial assembly comprises a first shaft coupled to the first end, a second shaft moveably engaging the first shaft and coupled to the second end, cover means extending from the first end for enclosing at least part of the firsst shaft, and a flexible boot extending between the second shaft and the cover means; and
    reflective optical means coupled to the assembly for directing light between the cover means and the first shaft, wherein movement of the second shaft relative to the first shaft at least partially absorbs the light.

8. The apparatus of claim 7 further comprising a window transparent to the light produced by the optical means, sealed to the cover means and located between the first shaft and an emitter and receiver of the optical means.

9. The apparatus of claim 8 wherein the window comprises at least one lense region between the emitter and the first shaft, wherein the lense region is thinner than a portion of the window surrounding the lense region.

10. The apparatus of claim 7 wherein the optical means comprises at least one emitter and at least two receivers, and wherein the at least one emitter and the at least two receivers are held in a mounting means facing the first shaft and wherein at least the receivers are mutually inclined so that straight lines extending therefrom intersect.

11. The apparatus of claim 7 wherein the optical means comprises at least an emitter-receiver pair, wherein the emitter and receiver of the emitter-receiver pair are mutually inclined at an angle so that straight lines drawn therefrom at that angle intersect substantially on the first shaft.

12. The apparatus of claim 7 wherein the optical means comprises an optical emitter directed toward the first shaft and an optical sensor oriented to receive light reflected from the first shaft.

13. The apparatus of claim 7 wherein the optical means comprises two light paths substantially perpendicular to a long dimension of the first shaft and spaced apart so that motion of the second shaft relative to the first shaft successively at least partially interrupts by absorption the two light paths.

14. The apparatus of claim 7 wherein the optical means operates through a single opening in the cover means.

15. An apparatus comprising:
    a first portion having a central shaft;
    a second portion for slideably engaging the central shaft;
    seal means extending between the first and second portions for forming a closed chamber over at least part of the central shaft; and reflective optical means for providing a light beam at least partially within the chamber and at least partially absorbed by motion of the second portion relative to the first portion.

16. The apparatus of claim 15 wherein the optical means provides a light beam directed at the central shaft.

17. The apparatus of claim 16 wherein the seal means comprises an optically absorbant material and wherein motion of the second portion from a first position to a second position relative to the first portion introduces the optically absorbant material into the light beam.

18. An apparatus for providing automatic load levelling comprising:
    pressure sealed actuator means for varying the position or orientation of first and second ends thereof;
    reflective optical sensor means at least partially internal to the apparatus for detecting the relative orientation or position of the first and second ends;
    controller means responding to the optical sensor means for actuating the actuator means to move the ends in a first direction when the relative predetermined amount and to move the ends in a second direction when the relative position is less than a first position is more than a second predetermined amount.

19. The apparatus of claim 18 wherein the optical sensor means comprises at least first and second optical paths arranged so that relative motion of the first and second ends causes a portion of the apparatus to successively at least partially interrupt by absorption the light traversing first one then another or both of the two light paths.

20. The apparatus of claim 19 wherein the optical means comprises at least one emitter and at least two receivers forming, respectively, the first and second light paths.

21. An apparatus adapted for attachment to an axially extensible device having an internal longitudinal shaft and piston moving thereon, for determining piston position along the shaft, comprising:
    a first optical transmitter-receiver means for directing a light beam to and from the central shaft;
    a second optical transmitter-receiver means for directing a light beam to and from the central shaft, and
    support means for holding the first and second optical transmitter-receiver means in spaced apart relationship in the direction of motion being detected.

22. The apparatus of claim 21 wherein the support means orients the first and second optical transmitter-receiver means so that the light beams of the first and second optical transmitter-receiver means lie in substantially parallel spaced-apart planes.

23. The apparatus of claim 22 wherein the substantially parallel spaced-apart planes are oriented so as to be substantially perpendicular to the direction of motion being detected.

24. An apparatus adapted for attachment to a vehicle levelling device which has an internal longitudinal shaft and piston moving thereon, for determining the piston position along the shaft, comprising:
    a first optical transmitter for directing a light beam toward the central shaft;
    a first optical receiver for detecting light reflected from the central shaft;
    a second optical transmitter for directing a light beam toward the central shaft;
    a second optical receiver for detecting light reflected from the central shaft; and
    wherein the light path between the first optical transmitter and first optical receiver defines a first plane and the light path between the second optical transmitter and second optical receiver defines a second plane, and wherein the first and second planes are substantially parallel and spaced apart a predetermined distance.

25. The apparatus of claim 24 wherein the first optical transmitter and first optical receiver are directed toward a first common point and the second optical transmitter and second optical receiver are directed toward a second common point, and wherein the first and second common points are spaced apart.

26. The apparatus of claim 25 further comprising support means for retaining the optical transmitters and receivers in the described orientation.

27. An apparatus adapted for attachment to an axially extensible device having an internal longitudinal shaft and piston moving thereon, for detecting piston motion along the shaft, comprising:
    at least one optical transmitter for directing light toward the central shaft; and
    a first optical receiver spaced apart from the at least one optical transmitter in a first direction, for detecting light originating from the transmitter and reflected from the central shaft;
    a second optical receiver spaced apart from the at least one optical transmitter in a second direction different than the first direction, for detecting light originating from the transmitter and reflected from the central shaft.

28. The apparatus of claim 27 wherein the first and second directions are opposite.

29. The apparatus of claim 28 wherein the first and second directions lie in a common plane.

30. The apparatus of claim 29 wherein the common plane is parallel to the direction of motion to be detected.

31. The apparatus of claim 27 wherein the transmitter and first and second optical receivers are oriented toward a common point.

* * * * *